United States Patent
Lin et al.

(10) Patent No.: US 12,554,485 B2
(45) Date of Patent: Feb. 17, 2026

(54) QUICKLY IDENTIFYING SOURCE CODE VERSION CAUSING REGRESSION

(71) Applicant: International Business Machines Corporation, Armonk, NY (US)

(72) Inventors: Ke Wen Lin, Shanghai (CN); Xiong Hu Luo, Shanghai (CN); Chaofan Qiu, Shanghai (CN); Li Rong Yi, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 17/811,908

(22) Filed: Jul. 12, 2022

(65) Prior Publication Data
US 2024/0020112 A1    Jan. 18, 2024

(51) Int. Cl.
G06F 8/71      (2018.01)
G06F 8/60      (2018.01)
G06F 8/65      (2018.01)
G06F 11/36     (2025.01)
G06F 11/3668   (2025.01)
G06F 8/41      (2018.01)
(Continued)

(52) U.S. Cl.
CPC ............ *G06F 8/71* (2013.01); *G06F 11/3688* (2013.01); *G06F 8/433* (2013.01); *G06F 8/60* (2013.01); *G06F 8/65* (2013.01); *G06F 11/079* (2013.01); *G06F 11/3616* (2013.01); *G06F 11/3668* (2013.01); *G06F 11/3672* (2013.01); *G06F 11/3676* (2013.01); *G06F 11/368* (2013.01); *G06F 11/3692* (2013.01)

(58) Field of Classification Search
CPC ..... G06F 8/71; G06F 8/60; G06F 8/65; G06F 8/433; G06F 11/3688; G06F 11/368; G06F 11/3692; G06F 11/3676; G06F 11/3668; G06F 11/079; G06F 11/3616; G06F 11/3672
See application file for complete search history.

(56) References Cited

U.S. PATENT DOCUMENTS

| | | | |
|---|---|---|---|
| 11,662,997 B2 * | 5/2023 | Farrier | G06F 8/71 |
| | | | 717/101 |
| 2013/0111267 A1 | 5/2013 | Beryoza et al. | |

(Continued)

OTHER PUBLICATIONS

Saha et al., "Selective Bisection Debugging," International Conference on Fundamental Approaches to Software Engineering, Lecture Notes in Computer Science, Mar. 2017, DOI: 10.1007/978-3-662-54494-5_4, pp. 60-77.

(Continued)

*Primary Examiner* — Anibal Riveracruz
(74) *Attorney, Agent, or Firm* — Yee & Associates, P.C.

(57) ABSTRACT

Managing source code change set commits to decrease time to identify software bugs in versions of a software project is provided. An initial order of relevant commits corresponding to the software project is determined in a priority queue based on a weight of each respective commit of the relevant commits. The initial order of the relevant commits is adjusted in the priority queue based on a build distance between the relevant commits of affected source files. A particular commit having a highest priority ranking is selected in the priority queue for build and test. The build and the test of the particular commit having the highest priority ranking in the priority queue is executed.

18 Claims, 11 Drawing Sheets

(51) Int. Cl.
    *G06F 11/07*          (2006.01)
    *G06F 11/3604*      (2025.01)

(56) References Cited

U.S. PATENT DOCUMENTS

| | | | |
|---|---|---|---|
| 2016/0034270 A1* | 2/2016 | Swierc | G06F 11/3668 |
| | | | 717/126 |
| 2017/0039062 A1 | 2/2017 | Wood et al. | |
| 2017/0091078 A1* | 3/2017 | Atyam | G06F 11/3616 |
| 2018/0307583 A1* | 10/2018 | Yang | G06F 11/368 |
| 2018/0307593 A1* | 10/2018 | Assulin | G06F 11/3692 |
| 2019/0057015 A1* | 2/2019 | Hassan | G06F 11/008 |
| 2019/0294528 A1* | 9/2019 | Avisror | G06F 11/3698 |
| 2019/0294536 A1* | 9/2019 | Avisror | G06F 11/3692 |
| 2023/0068689 A1* | 3/2023 | Dutta | G06F 11/3676 |

OTHER PUBLICATIONS

An et al., "Reducing the Search Space of Bug Inducing Commits using Failure Coverage," ACM Joint European Software Engineering Conference and Symposium on the Foundations of Software Engineering (ESEC/FSE), Aug. 23-28, 2021, Athens, Greece, 4 pages. https://coinse.kaist.ac.kr/publications/pdfs/An2021qb.pdf.

"New optimization bisect implementation (now modeled on optnone handling)," accessed May 11, 2022, published Apr. 15, 2016, 3 pages. https://reviews.llvm.org/D19172.

"Git-pisect: A Parallel Version of git-bisect," accessed May 10, 22, published Nov. 2016, 5 pages. https://hoelz.ro/blog/git-pisect.

\* cited by examiner

QUICKLY IDENTIFYING SOURCE CODE VERSION CAUSING REGRESSION

BACKGROUND

1. Field

The disclosure relates generally to software development and more specifically to initializing a priority queue of commits for software versions in a suspected version interval to be built and tested based on source code coverage information, historical test case failure and fix record information, and source code dependency graph information to decrease time to identify software bugs in versions of a software project.

2. Description of the Related Art

Software development is the process of conceiving, specifying, designing, programming, documenting, testing, and bug fixing involved in creating and maintaining applications or other software components. Software development involves writing and maintaining the source code and includes all processes from the conception of the desired software through to the final manifestation of the software. Source code is a collection of code written using a human-readable programming language, usually as plain text. The source code of a software program is designed to facilitate the work of computer programmers, who specify the actions to be performed by a computer mostly by writing source code. The source code is often transformed by a compiler or an assembler into binary machine code that can be executed by the computer.

A process for continuous delivery of software is continuous integration. Continuous integration is a development practice where developers commit their code changes, usually small and incremental code changes, to a centralized source code repository, which initiates a set of automated builds and tests. This centralized source code repository allows developers to automatically identify software bugs early before passing the software bugs on to production. A continuous integration pipeline usually involves a series of steps, starting from code commit to performing basic automated linting analysis, capturing dependencies, and finally building the software and performing basic tests.

Regression testing and possible subsequent failure analysis is necessary in software development. Regression testing is re-running functional and non-functional tests to ensure that previously developed and tested software still performs after a change. If the software does not perform after the change, that is a regression. Changes that require regression testing include, for example, software bug fixes, software enhancements, configuration changes, and substitution of hardware components. One current process to identify a culprit or bad commit change set, which caused a software bug in the source code of a software project, is to isolate the culprit in a version interval between the last known "good" version and the first known "bad" version.

SUMMARY

According to one illustrative embodiment, a computer-implemented method for ranking source code change set commits to decrease time to identify software bugs in versions of a software project is provided. A computer determines an initial order of relevant commits corresponding to the software project in a priority queue based on a weight of each respective commit of the relevant commits. The computer adjusts the initial order of the relevant commits in the priority queue based on a build distance between the relevant commits of affected source files. The computer selects a particular commit having a highest priority ranking in the priority queue for build and test. The computer executes the build and the test of the particular commit having the highest priority ranking in the priority queue. According to other illustrative embodiments, a computer system and computer program product for ranking source code change set commits to decrease time to identify software bugs in versions of a software project are provided.

DETAILED DESCRIPTION

Figure 1:
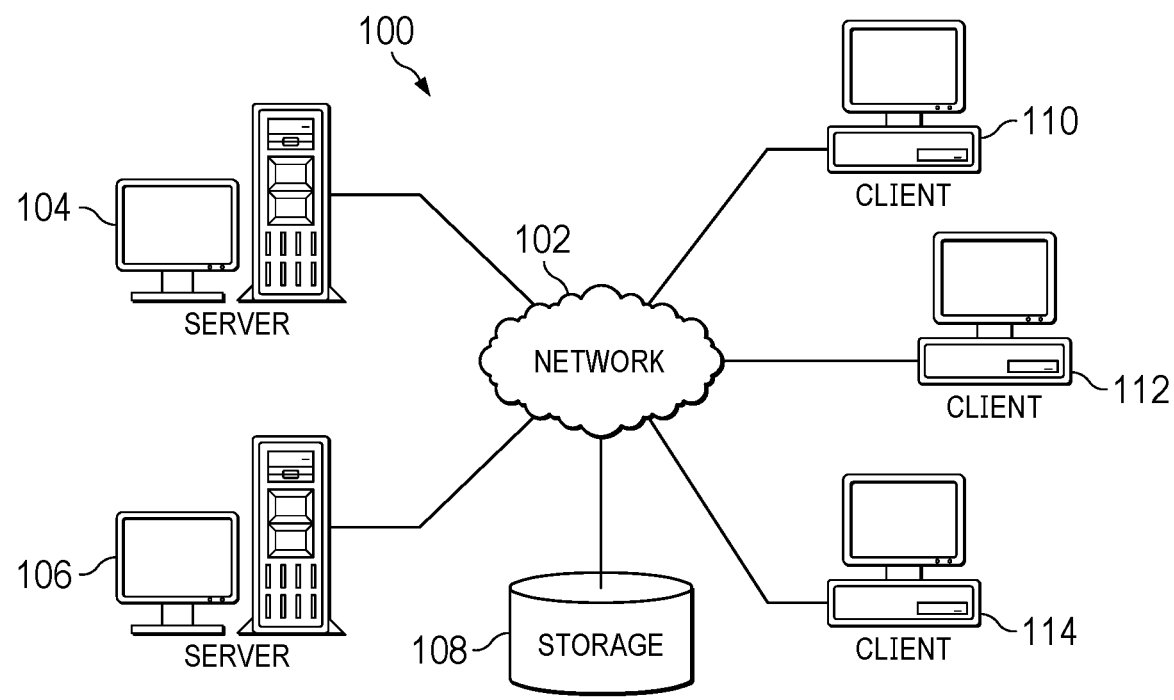
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
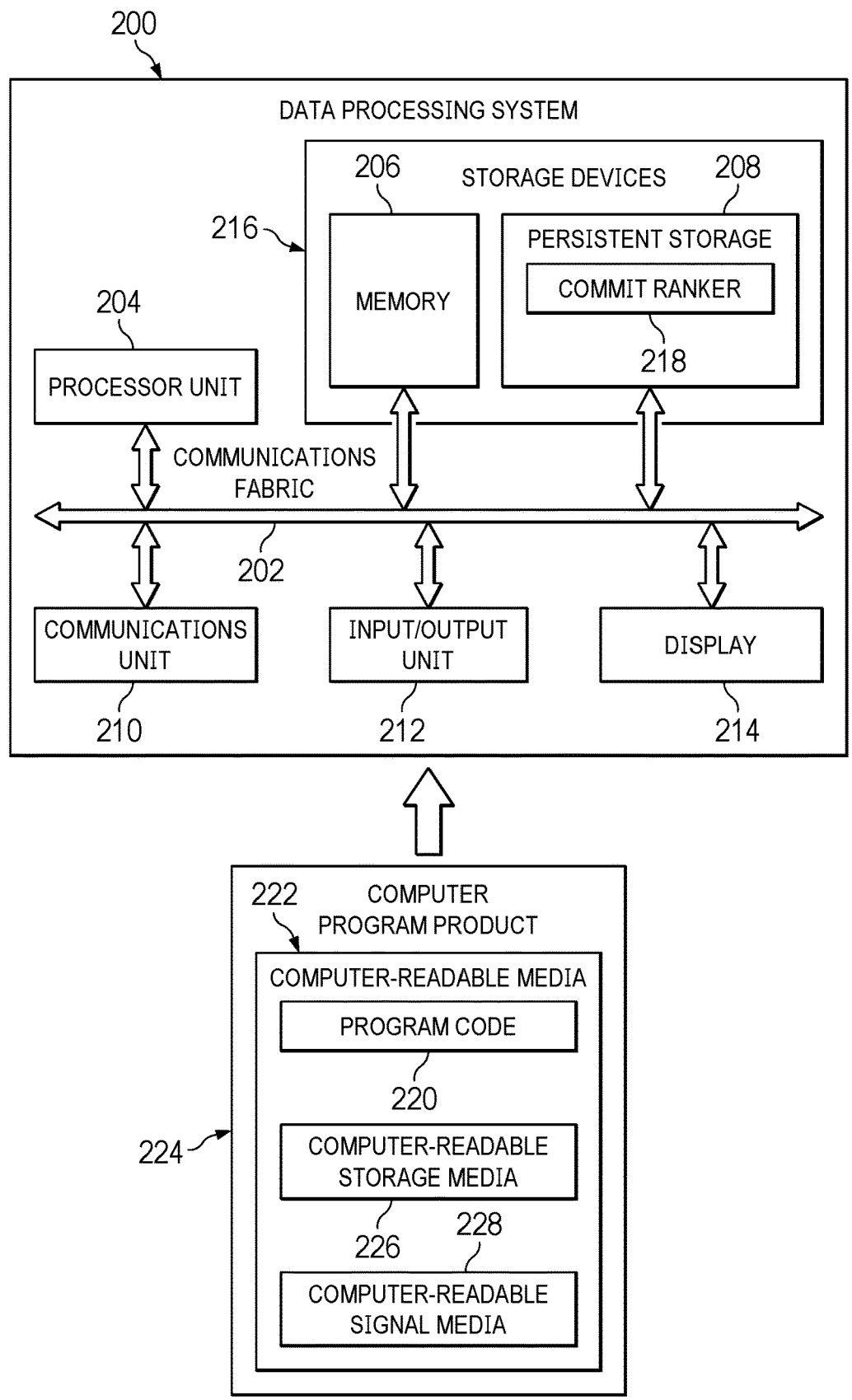
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 provide a set of services for ranking source code change set commits in a priority queue to client device users to decrease build and test time for software projects. For example, server 104 and server 106 provide the source code change set commit ranking services by placing source code change set commits corresponding to a software project in a priority queue and adjust the order of source code change set commits in the priority queue to decrease build and test time based on source code coverage information, historical test case failure and fix record information, and source code dependency graph information corresponding to the software project. By decreasing the build and test time of the source code versions in the priority queue, server 104 and server 106 decrease the time needed to identify software bugs in versions of the software project. A source code change set commit refers to a group of changes to given source files corresponding to the software project in a source code repository. A version refers to a specific state of the software project having a plurality of source code change set commits in the history of the software project.

Client 110, client 112, and client 114 also connect to network 102. Clients 110, 112, and 114 are client devices of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart televisions, and the like, with wire or wireless communication links to network 102. Users of clients 110, 112, and 114 may utilize clients 110, 112, and 114 to submit source code change sets (i.e., software revisions, code changes, software bug fixes, and the like) corresponding to a plurality of different software projects to a centralized source code repository, such as, for example, storage 108, and request the source code change set commit ranking services provided by server 104 and server 106.

Storage 108 is a network storage device capable of storing any type and number of software projects. A software project may be, for example, a software application, program, operating system, component, module, or the like. In addition, storage 108 may represent a plurality of network storage devices. Further, storage 108 may store identifiers and network addresses for a plurality of client devices, identifiers for a plurality of client device users, and the like. Furthermore, storage 108 may store other types of data, such as authentication or credential data that may include usernames, passwords, and the like associated with, for example, client device users and system administrators.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the source code change set commit ranking processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory, or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores commit ranker 218. However, it should be noted that even though commit ranker 218 is illustrated as residing in persistent storage 208, in an alternative illustrative embodiment commit ranker 218 may be a separate component of data processing system 200. For example, commit ranker 218 may be a hardware component coupled to communication fabric 202 or a combination of hardware and software components.

Commit ranker 218 controls the process of removing irrelevant source code change set commits corresponding to a software project based on source code coverage information, placing remaining relevant source code change set commits in a priority queue, assigning a weight to each respective source code change set commit in the priority queue based on historical test case failure and fix record information corresponding to source files affected by the commits in the priority queue, adjusting the order of the source code change set commits in the priority queue based on a given commit's assigned weight, and reordering the source code change set commits in the priority queue based on source code dependency graph information corresponding to the source files affected by the commits that indicates build distance between the commits to decrease build and test time of the software project. Commit ranker 218 then executes the build and test of each respective commit in the priority queue based on that particular commit's position in the priority queue to decrease the time needed to identify software bugs in versions of the software project. In other words, commit ranker 218 first executes the build and test of the commit having the highest priority in the priority queue. Typically, the commit associated with the source file that performed the worst during its test case, will be the commit having the highest priority in the priority queue because the associated source file probably caused regression in the software project.

As a result, data processing system 200 operates as a special purpose computer system in which commit ranker 218 in data processing system 200 enables decreased build and test time for a software project by ordering source code change set commits in a priority queue for execution based on source code coverage information, historical test case failure and fix record information, and source code dependency graph information to decrease the time needed to identify software bugs in versions of the software project. In particular, commit ranker 218 transforms data processing system 200 into a special purpose computer system as compared to currently available general computer systems that do not have commit ranker 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity, Bluetooth® technology, global system for mobile communications, code division multiple access, second-generation, third-generation, fourth-generation, fourth-generation Long Term Evolution, Long Term Evolution Advanced, fifth-generation, or any other wireless communication technology or standard to establish a wireless communications link for data processing system 200. Bluetooth is a registered trademark of Bluetooth Sig, Inc., Kirkland, Washington.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Source code repositories are typically based on some type of source code management system for tracking changes in any set of files, usually used for coordinating work among programmers collaboratively developing source code during development of a software project. These current source code management systems generally utilize bisection to isolate the culprit commit change sets. Bisection is a binary code search-based regression process. The worst-case time complexity is O(log n). The worst-case time complexity is the upper bound or the maximum number of operations it takes to complete. O(log n) means time goes up linearly while "n" goes up exponentially. As a result, if it takes 1 second to compute 10 elements, it will take 2 seconds to compute 100 elements, 3 seconds to compute 1000 elements, and so on. O(log n) is typically used in a divide and conquer type algorithm, such as a binary code search-based algorithm. As a result, bisection may take long time to build and test after source code revision switching. Total bisection time is equal to "each build time+each test time+commit switch time". For example, when re-building a large software project, a change to a particular header file can increase build time significantly, even with incremental build (e.g., a typical build of a compiler can take approximately 1 hour). The test time to investigate a compiler bug may require verifying a suite of benchmarks, which is very time-intensive (e.g., 10 or more hours for the entire suite of benchmarks or several hours for only a selected group of the entire suite of benchmarks). Currently, no solution exists for improving bisection performance to decrease the time needed to identify software bugs in versions of a software project.

However, illustrative embodiments improve computer performance by decreasing build and test time for culprit commit isolation on a software project to decrease the time needed to identify software bugs in versions of the software project. Illustrative embodiments identify a bad commit change set in a source code revision using stored source code coverage information and source code dependency graph information, which are provided by a compiler, and stored historical test case failure and fix records.

For example, illustrative embodiments determine whether source code coverage information currently exists for a given software project. If source code coverage information does not currently exist, then illustrative embodiments utilize the compiler to generate an instrumented application (e.g., a profile-guided compiler, itself) and execute the test case to acquire the source code coverage information related to the instrumented application. Then, illustrative embodiments utilize the source code coverage information to exclude those irrelevant commits that are related to, for example, other targets, other programming languages, or other unrelated components. Also, for source files not covered in the testing, any commit change sets on those source files are treated as irrelevant. By filtering out irrelevant commits, illustrative embodiments decrease the total number of commits to be built and tested and, therefore, increase performance of the computer. For relevant commits, the more intersection between a commit change set and the source code coverage information, illustrative embodiments increase priority of that particular commit by assigning a higher weight to that particular commit. It should be noted that illustrative embodiments operate at the source file level and utilize one source file repository to decrease time consumption.

The source code dependency graph information indicates build dependency distance between versions of the software project. The compiler collects all the source code dependency relationship information in the build. Using the source code dependency relationship information provided by the compiler, illustrative embodiments determine how many source files need to be rebuilt as the build distance when changing from one version to another version of the software project, which reflects the amount of build time that changes after resetting from one version to another version. When the build time is time intensive, which is user-defined, illustrative embodiments utilize a priority queue to minimize the build time by leveraging incremental build.

Illustrative embodiments place the relevant commits in the priority queue. Illustrative embodiments assign a weight to each respective commit, which involves some poorly performing source files according to the historical test case failure and fix information (e.g., records), in the priority queue. Features of a software project typically have some corresponding test case information. For example, if most of the failures of a test case were due to some particular source files, then illustrative embodiments suspect a commit that involves those particular source files as potentially causing regression and assign a higher weight to that particular commit. Illustrative embodiments then adjust the order of commits in the priority queue according to assigned weights. In other words, a commit having a highest weight has a highest priority position or rank in the priority queue. Conversely, a commit having a lowest weight has a lowest priority position or rank in the priority queue.

In addition, illustrative embodiments readjust or reorder the commits in the priority queue to decrease total build time with fewer incremental builds when the build phase is time-intensive as defined by a user. To decrease the total build time with fewer incremental builds, illustrative embodiments readjust the order of the commits in the priority queue based on build distance between versions of the software project. Illustrative embodiments utilize the source code dependency graph information provided by the compiler to determine the build distance between respective versions. Different commit pairs (e.g., any two commits within a version interval between a last known good version and a first known bad version) have different delta files and different incremental build times. For any commits having a same weight, illustrative embodiments try to order those same weighted commits in the priority queue to decrease total build time. When the build phase is time-intensive, illustrative embodiments readjust the commits in the priority queue based on the build distance between versions of the software project, which can be learned from the source code dependency graph information.

Further, illustrative embodiments estimate time complexity to determine whether or not to fall back to the traditional binary code search-based approach (i.e., bisection) to avoid the worst-time complexity. In response to illustrative embodiments determining that bisection should be used to avoid the worst-time complexity based on the estimated time complexity exceeding a time complexity upper bound, illustrative embodiments transition to bisection. As a result, illustrative embodiments guarantee that the worst-time complexity is log 2(N). Based on heuristics, illustrative embodiments can decrease the original commit range from, for example, (A, A+B) to, for example, (A+C, A+B−D), which is helpful to bisection.

Illustrative embodiments utilize a feedback component to iteratively update the source code coverage information, the historical test case failure and fix record information, and the source code dependency graph information, which improves the heuristics and thresholds over time to decrease the time needed to identify software bugs in versions of the software project. Because illustrative embodiments compute and adjust the priority queue using the steps above, the order of commits in the priority queue is based on different weights and factors. It is important to improve data relationship models gradually by including feedback as a supplement to the source code coverage information because different snapshots of the software project may contain differences. As a result, illustrative embodiments can decrease build and test time significantly for a software project.

Thus, illustrative embodiments provide one or more technical solutions that overcome a technical problem with bisection, which requires a significant amount of build and test time to identify software bugs in versions of a software project. As a result, these one or more technical solutions provide a technical effect and practical application in the field of software development.

Figure 3:
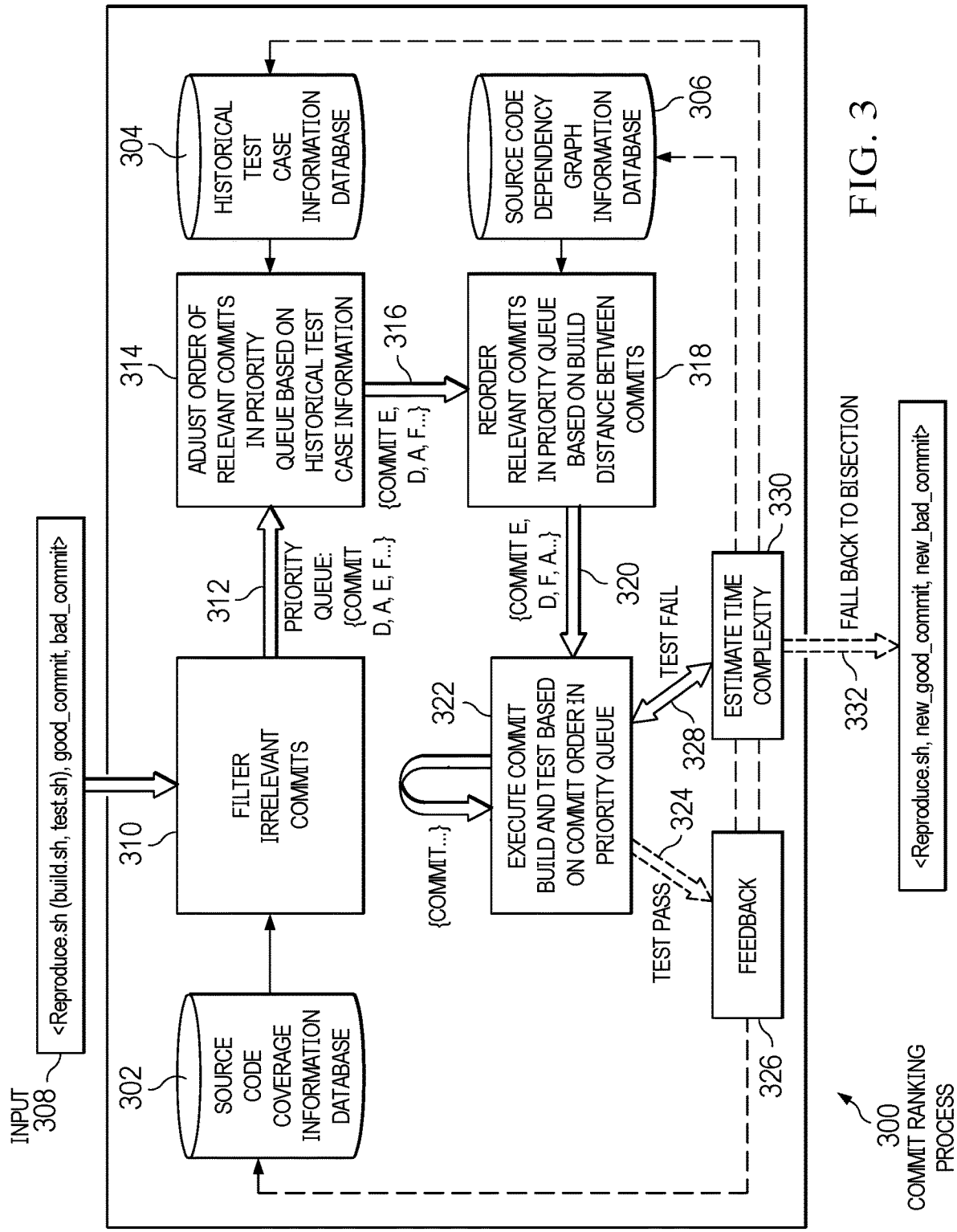
FIG. 3 is a diagram illustrating an example of a commit management process in accordance with an illustrative embodiment.

With reference now to FIG. 3, a diagram illustrating an example of a commit management process is depicted in accordance with an illustrative embodiment. Commit ranking process 300 can be implemented in a computer, such as, for example, server 104 in FIG. 1 or data processing system 200 in FIG. 2. For example, commit ranking process 300 can be implemented in commit ranker 218 in FIG. 2.

In this example, commit ranking process 300 includes source code information coverage information database 302, historical test case information database 304, and source code dependency graph information database 306. Commit ranking process 300 begins in response to receiving input 308 to build and test a component of a software project from a user of a client device, such as, for example, client 110 in FIG. 1.

In response to receiving input 308, the commit ranker retrieves information from source code information coverage information database 302 corresponding to the software project. At 310, the commit ranker filters out irrelevant commits that do not correspond to the component of the software project based on the retrieved information from source code coverage information database 302. At 312, the commit ranker places remaining relevant commits corresponding to the component in a priority queue. The initial order of commits may be, for example, commit D, A, E, F, . . . . After placing the remaining relevant commits corresponding to the component in the priority queue, the commit ranker retrieves information from historical test case information database 304 corresponding to source files affected by the remaining relevant commits in the priority queue and assigns a weight to each respective commit in the priority queue based on the retrieved failure and fix record information from historical test case information database 304.

At 314, the commit ranker adjusts the order of the relevant commits in the priority queue based on the weight assigned to each respective commit. Now, at 316, the order of commits may be, for example, commit E, D, A, F, . . . . After adjusting the order of the relevant commits in the priority queue, the commit ranker retrieves information from source code dependency graph information database 306, which indicates build distance between versions of the software project. At 318, the commit ranker reorders the relevant commits in the priority queue based on the retrieved information from source code dependency graph information database 306 regarding the build distance between those versions. As a result, at 320, the order of commits may now be, for example, commit E, D, F, A, . . . .

At 322, the commit ranker executes build and test of each respective relevant commit based on the commit order in the priority queue (e.g., commit E, D, F, A, . . . ). At 324, if test of a given relevant commit (e.g., commit E) is pass, then the commit ranker generates feedback 326 regarding the successful build and test of that particular relevant commit and updates source code information coverage information database 302, historical test case information database 304, and source code dependency graph information database 306 based on feedback 326. However, at 328, if test of that particular relevant commit (e.g., commit E) is fail, then, at 330, the commit ranker estimates time complexity corresponding to commits in the priority queue. If the estimated time complexity is greater than or equal to a time complexity upper bound, then, at 332, the commit ranker utilizes traditional bisection to detect culprit or bad commits. If the estimated time complexity is less than the time complexity upper bound, then the commit ranker continues to execute the build and test of the next relevant commit (e.g., commit D) in the priority queue.

Figure 4:
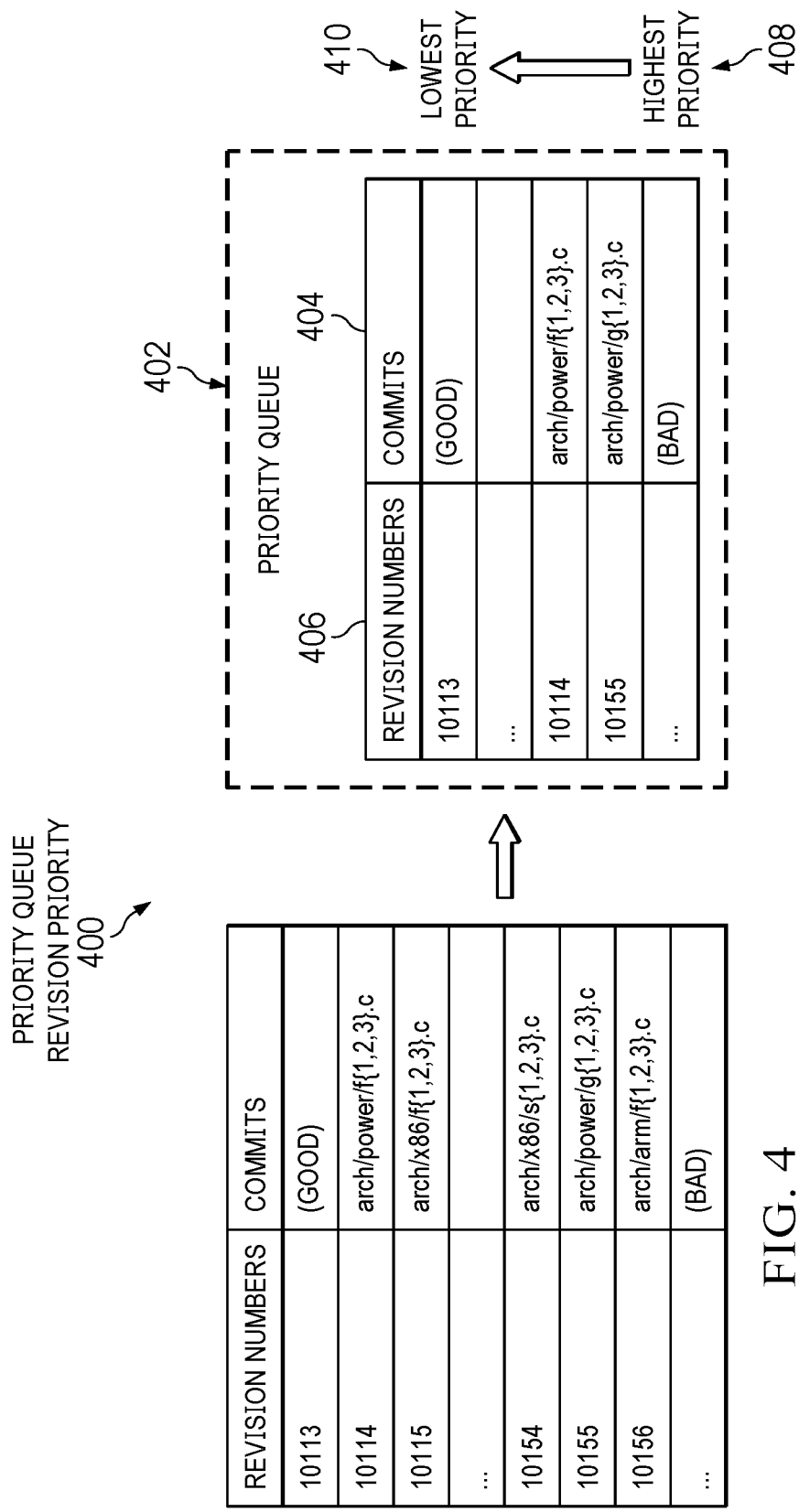
FIG. 4 is a diagram illustrating an example of priority queue revision priority in accordance with an illustrative embodiment.

With reference now to FIG. 4, a diagram illustrating an example of priority queue revision priority is depicted in accordance with an illustrative embodiment. Priority queue revision priority 400 can be implemented in a computer, such as, for example, server 104 in FIG. 1 or data processing system 200 in FIG. 2. For example, priority queue revision priority 400 can be implemented in commit ranker 218 in FIG. 2.

In this example, priority queue revision priority 400 includes priority queue 402. Priority queue 402 includes commits 404 and revision numbers 406. Commits 404 represent relevant commits corresponding to a component of a software project being at least one of built or modified by a set of users. Revision numbers 406 correspond to commits 404. Also in this example, priority queue 402 lists commits 404 in ascending order from highest priority 408 (i.e., bad commits) to lowest priority 410 (i.e., good commits). However, it should be noted that priority queue 402 can alternatively list commits 404 in descending order.

The commit ranker starts with the most suspicious commits first (e.g., starts the build and test of the highest priority commit of commits 404 in priority queue 402, then to the next highest priority commit, and so on) because these commits are more likely to cause regression in the software project. In this example, the commit ranker starts the build and test of "arch/power/g{1,2,3}.c" with revision number 10155 having the highest priority, and then to "arch/power/f{1,2,3}.c" with revision number 10114 having the next highest priority, and so on.

Figure 5:
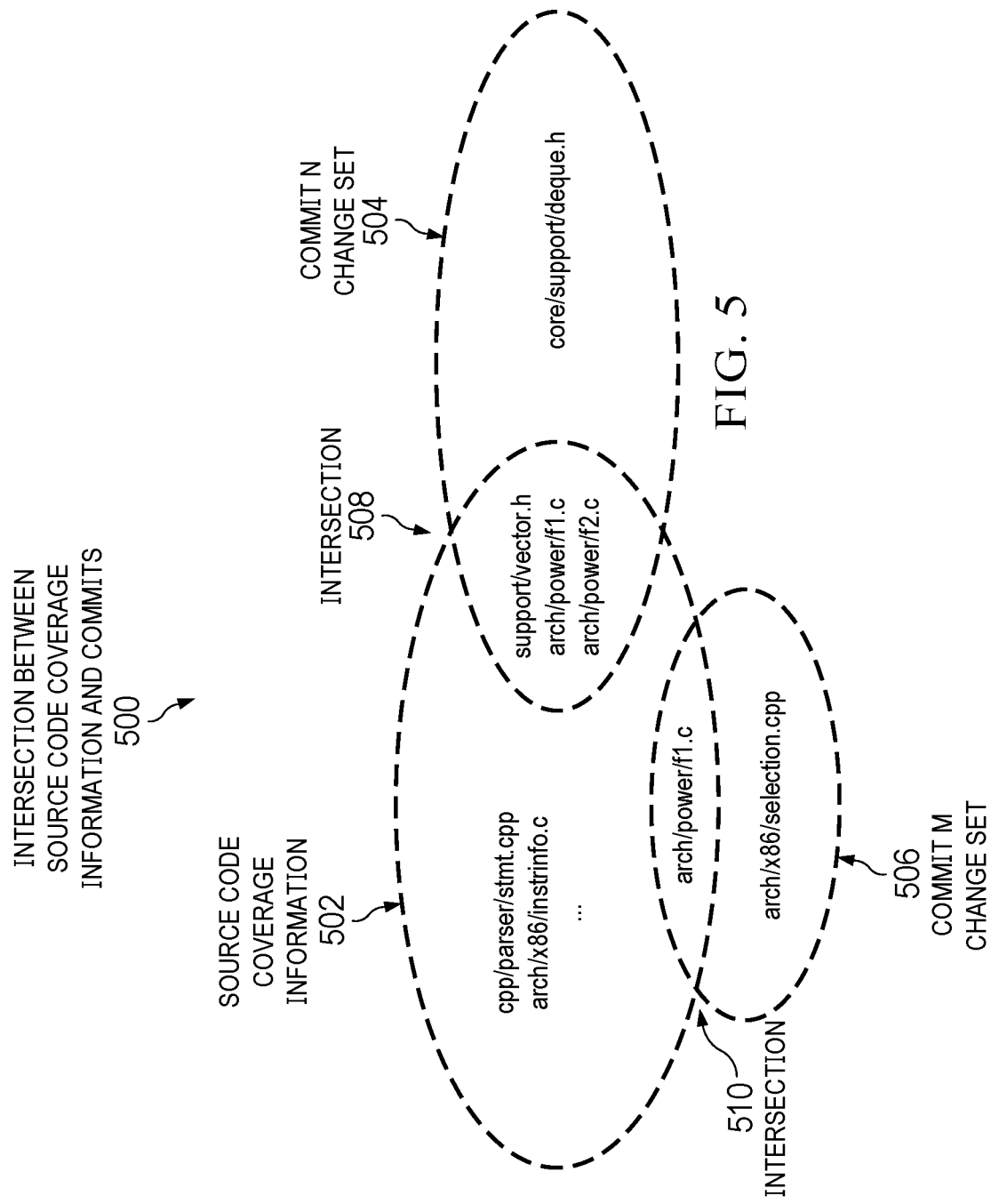
FIG. 5 is a diagram illustrating an example of intersection between source code coverage information and commits in accordance with an illustrative embodiment.

With reference now to FIG. 5, a diagram illustrating an example of intersection between source code coverage information and commits is depicted in accordance with an illustrative embodiment. Intersection between source code coverage information and commits 500 can be implemented in a computer, such as, for example, server 104 in FIG. 1 or data processing system 200 in FIG. 2. For example, intersection between source code coverage information and commits 500 can be implemented in commit ranker 218 in FIG. 2.

In this example, intersection between source code coverage information and commits 500 includes source code coverage information 502 (e.g., "cpp/parset/stmt.cpp", "arch/x86/instrinfo.c", ... ), commit N change set 504 (e.g., "core/support/deque.h"), and commit M change set 506 (e.g., "arch/x86/selection.cpp"). However, it should be noted that intersection between source code coverage information and commits 500 is intended as an example only and not as a limitation on illustrative embodiments. In other words, intersection between source code coverage information and commits 500 may include any type of source code coverage information and any number of related commit change sets.

Also in this example, commit N change set 504 has more intersection with the source code coverage information 502 as opposed to commit M change set 506. For example, intersection 508 includes "support/vector.h", "arch/power/f1.c", and "arch/power/f2.c" between source code coverage information 502 and commit N change set 504. In contrast, intersection 510 includes "arch/power/f1.c" between source code coverage information 502 and commit M change set 506. Consequently, the commit ranker determines that commit N change set 504 is more likely to be related to a software bug causing regression of the source code of the software project because of the increased intersection with source code coverage information 502. As a result, the commit ranker assigns a higher weight to commit N change set 504 and, therefore, places commit N change set 504 at a higher priority ranking position in a priority queue, such as, for example, priority queue 402 in FIG. 4. Conversely, the commit ranker determines that commit M change set 506 is less likely to be related to a software bug causing regression of the source code because of the decreased intersection with source code coverage information 502. As a result, the commit ranker assigns a lower weight to commit M change set 506 and, therefore, places commit M change set 506 at a lower priority ranking position in the priority queue.

Figure 6:
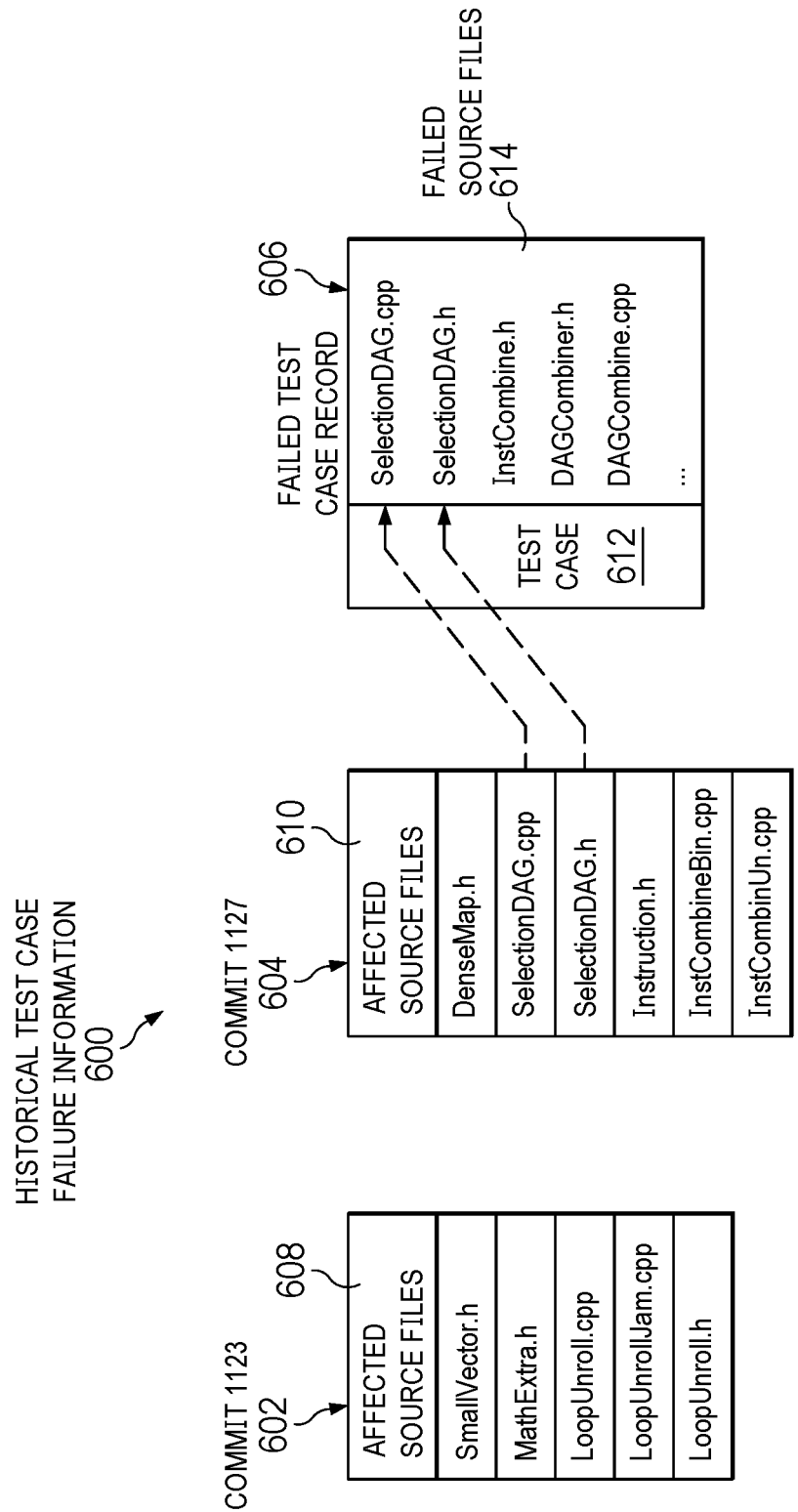
FIG. 6 is a diagram illustrating an example of historical test case failure information in accordance with an illustrative embodiment.

With reference now to FIG. 6, a diagram illustrating an example of historical test case failure information is depicted in accordance with an illustrative embodiment. Historical test case failure information 600 can be implemented in a historical test case information database, such as, for example, historical test case information database 304 in FIG. 3, and utilized by a commit ranker, such as, for example, commit ranker 218 in FIG. 2.

In this example, historical test case failure information 600 includes commit 1123 602, commit 1127 604, and failed test case record 606. Commit 1123 602 involves affected source files 608 of the software project (e.g., "SmallVector.h", "MathExtra.h", "LoopUnrol.cpp", "LoopUnrollJam.cpp", and "LoopUnroll.h"). Affected source files 608 identify the source files affected by commit 1123 602. Commit 1127 604 involves affected source files 610 of the software project (e.g., "DenseMap.h", "SelectionDAG.cpp", "SelectionDAG.h", "Instruction.h", "InstCombineBin.cpp", and "InstCombinUn.cpp"). Affected source files 610 identify the source files affected by commit 1127 604. Failed test case record 606 includes test case 612 and failed source files 614. Test case 612 identifies the type of test case used by a compiler to generate failed test case record 606. Failed source files 614 identify the source files that failed during execution of test case 612.

It should be noted that in this example, "SelectionDAG.cpp" and "SelectionDAG.h" of affected source files 610 are also included in failed source files 614 of failed test case record 606. As a result, the commit ranker determines that commit 1127 604 involving source files "SelectionDAG.cpp" and "SelectionDAG.h" is more likely to have caused regression in the source code of the software project. Therefore, the commit ranker will assign a higher weight to commit 1127 604 and place commit 1127 604 in a higher priority ranking position in the priority queue.

Figure 7:
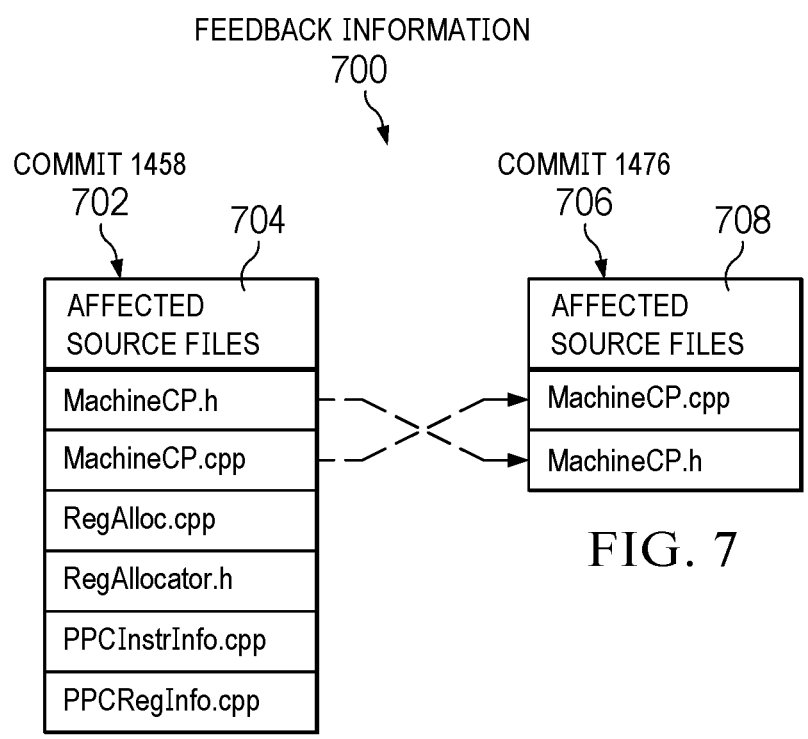
FIG. 7 is a diagram illustrating an example of feedback information in accordance with an illustrative embodiment.
Figure 8A:
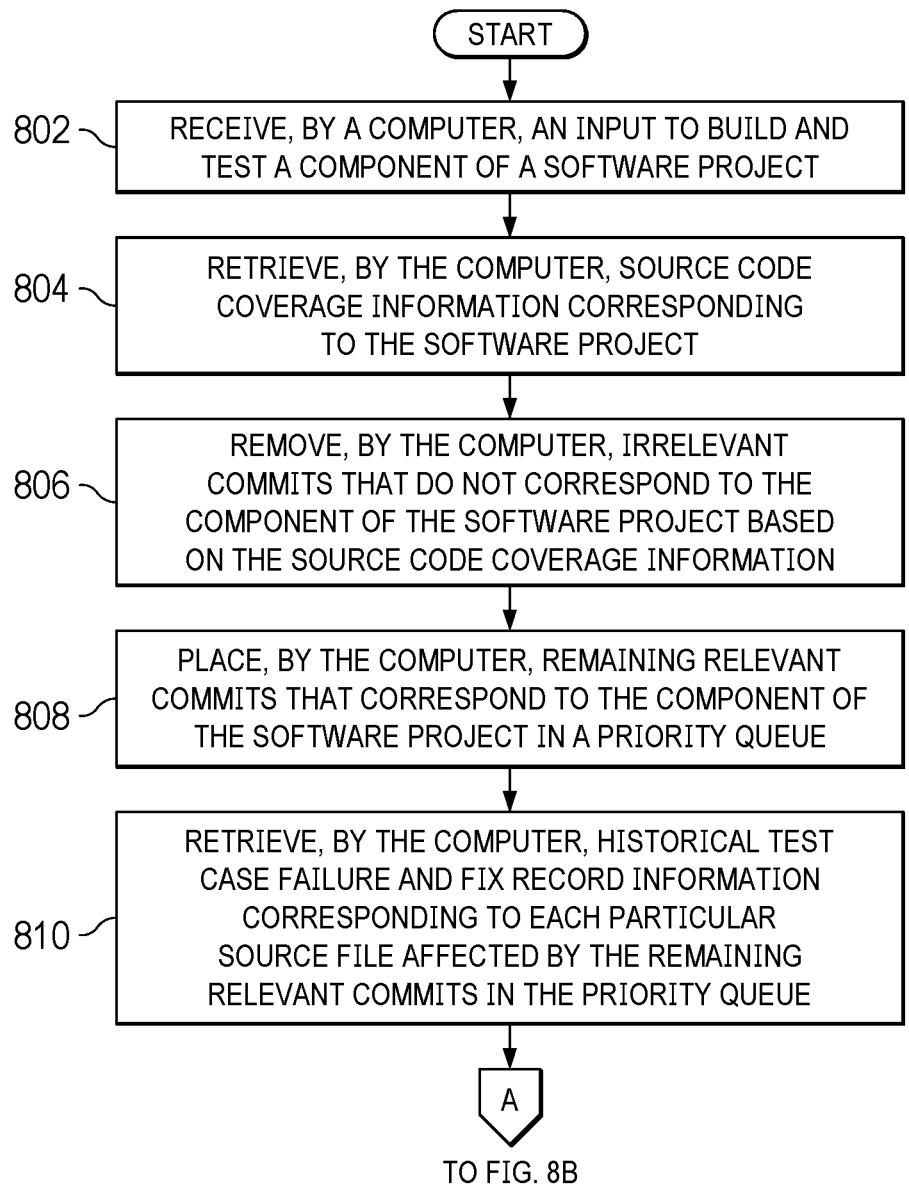
FIGS. 8A-8D are a flowchart illustrating a process for ranking source code change set commits to decrease time to identify software bugs in versions of a software project in accordance with an illustrative embodiment.
Figure 8B:
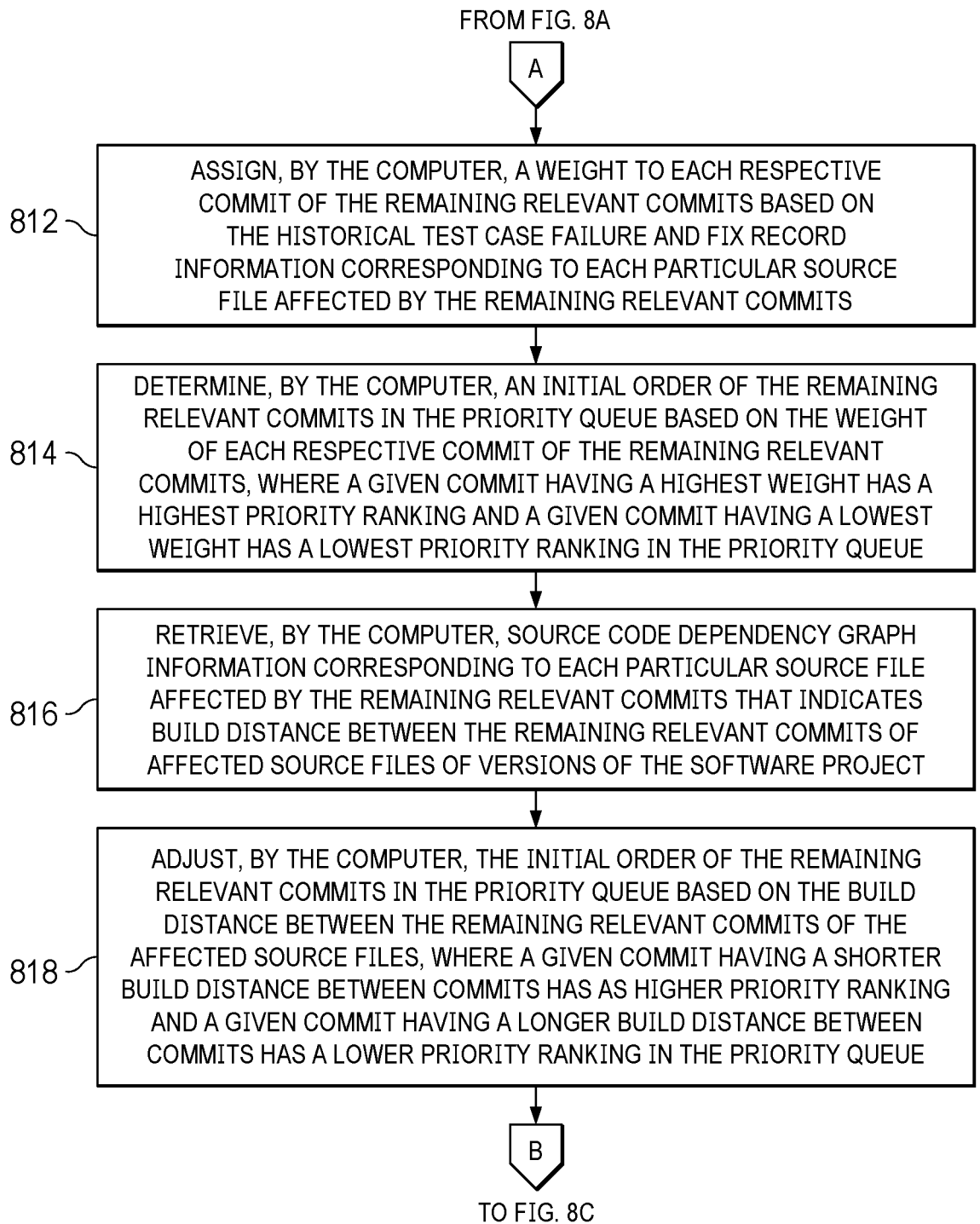
Figure 8C:
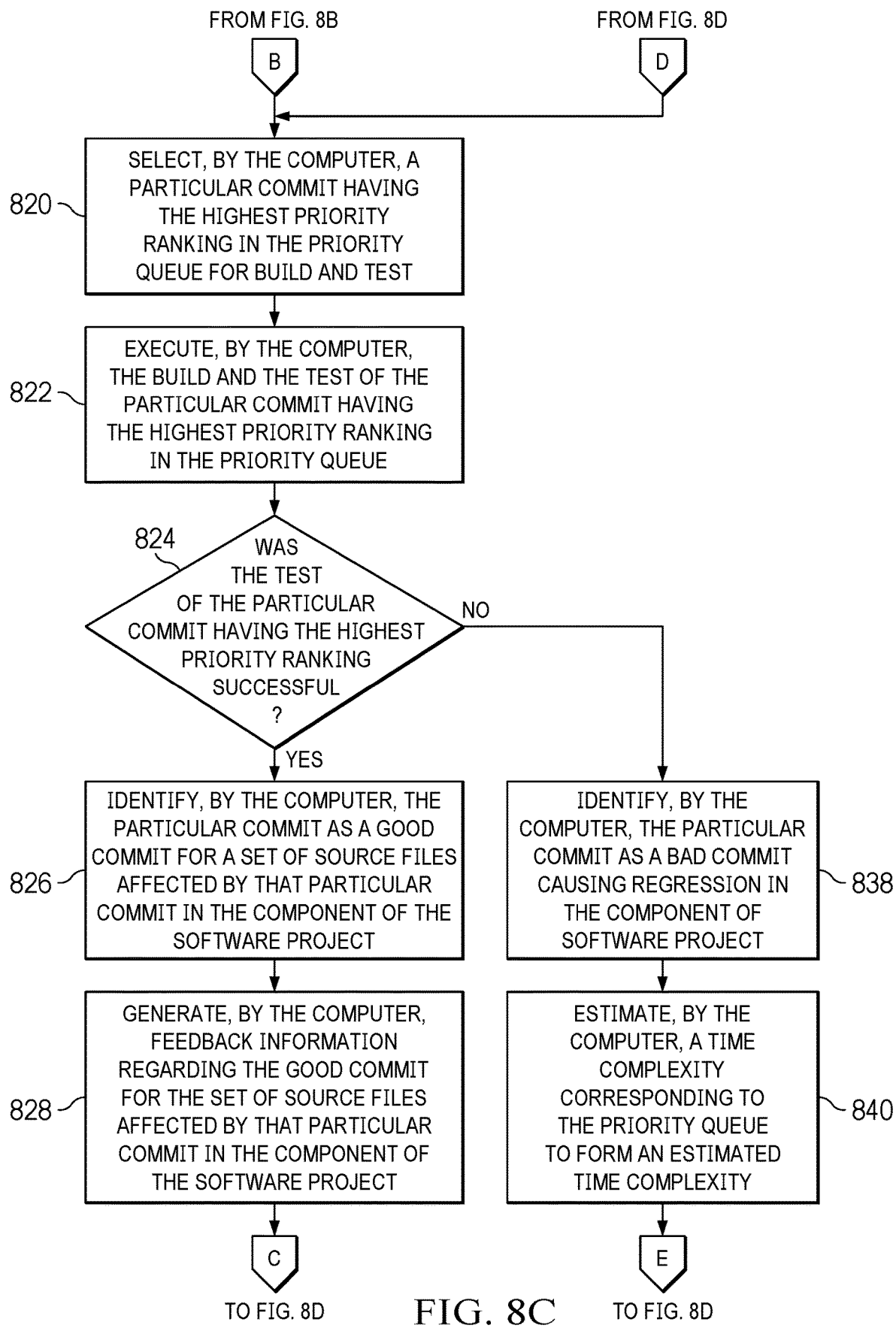
Figure 8D:
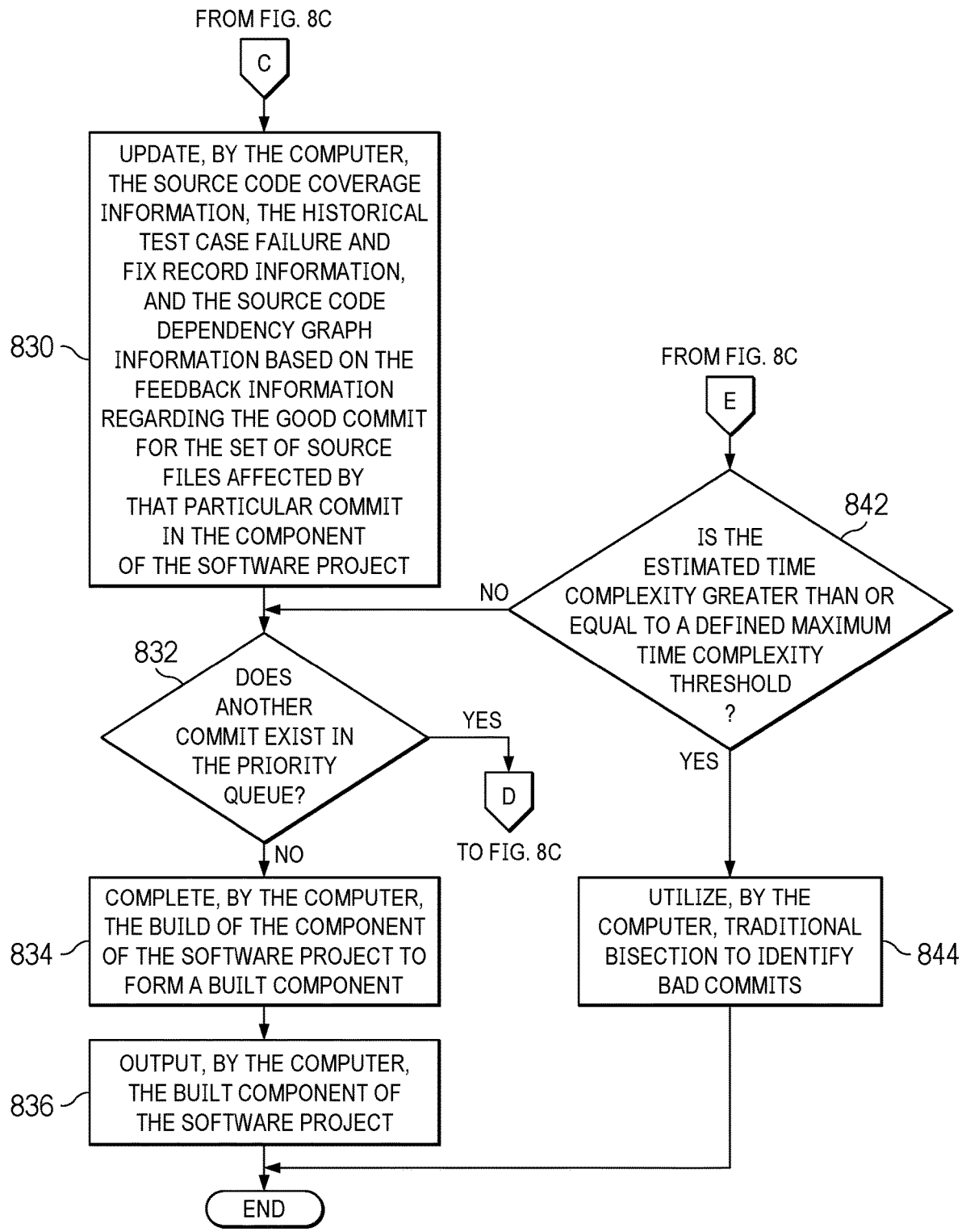

With reference now to FIG. 7, a diagram illustrating an example of feedback information is depicted in accordance with an illustrative embodiment. Feedback information 700 can be implemented in a computer, such as, for example, server 104 in FIG. 1 or data processing system 200 in FIG. 2. For example, feedback information 700 can be implemented in commit ranker 218 in FIG. 2.

In this example, feedback information 700 includes commit 1458 702 and commit 1476 706. However, it should be noted that feedback information 700 is intended as an example only and not as a limitation on illustrative embodiments. In other words, feedback information 700 may include any type and number of commits corresponding to a software project.

In this example, commit 1458 702 involves affected source files 704 (e.g., "MachineCP.h", "MachineCP.cpp", "RegAlloc.cpp", "RegAllocator.h", "PPCInstrinfo.cpp", and "PPCRegInfo.cpp"). Commit 1476 706 involves affected source files 708 (e.g., "MachineCP.h" and "MachineCP.cpp"). It should be noted that "MachineCP.h" and "MachineCP.cpp" of affected source files 704 are also included in affected source files 708.

As an illustrative example, if the commit ranker determines that commit 1458 702 is not the cause of regression in the software project because, for example, none of affected source files 704 are included in a failed test case record, such as, for example, failed test case record 606 in FIG. 6, then the commit ranker will determine that commit 1458 706 is also not the cause of regression. As a result, the commit ranker places commit 1458 702 and commit 1476 706 in lower priority ranking positions in the priority queue because commit 1458 702 and commit 1476 706 are less likely to be bad commit change sets.

With reference now to FIGS. 8A-8D, a flowchart illustrating a process for ranking source code change set commits to decrease time to identify software bugs in versions of a software project is shown in accordance with an illustrative embodiment. The process shown in FIGS. 8A-8D may be implemented in a computer, such as, for example, server 104 in FIG. 1 or data processing system 200 in FIG. 2. For example, the process shown in FIGS. 8A-8D may be implemented in commit ranker 218 in FIG. 2.

The process begins when the computer receives an input to build and test a component of a software project (step 802). In response to receiving the input, the computer retrieves source code coverage information corresponding to the software project (step 804). In addition, the computer removes irrelevant commits that do not correspond to the component of the software project based on the source code coverage information (step 806).

The computer places remaining relevant commits that correspond to the component of the software project in a priority queue (step 808). The computer retrieves historical test case failure and fix record information corresponding to each particular source file affected by the remaining relevant commits in the priority queue (step 810). The computer assigns a weight to each respective commit of the remaining relevant commits based on the historical test case failure and fix record information corresponding to each particular source file affected by the remaining relevant commits (step 812).

The computer determines an initial order of the remaining relevant commits in the priority queue based on the weight of each respective commit of the remaining relevant commits (step 814). A given commit having a highest weight has a highest priority ranking in the priority queue and a given commit having a lowest weight has a lowest priority ranking in the priority queue. The computer retrieves source code dependency graph information corresponding to each particular source file affected by the remaining relevant commits that indicates build distance between the remaining relevant commits of affected source files of versions of the software project (step 816).

The computer adjusts the initial order of the remaining relevant commits in the priority queue based on the build distance between the remaining relevant commits of the affected source files (step 818). A given commit having a shorter build distance between commits has as higher priority ranking in the priority queue and a given commit having a longer build distance between commits has a lower priority ranking in the priority queue. The computer selects a particular commit having the highest priority ranking in the priority queue for build and test (step 820). The computer executes the build and the test of the particular commit having the highest priority ranking in the priority queue (step 822).

The computer makes a determination as to whether the test of the particular commit having the highest priority ranking was successful (step 824). If the computer determines that the test of the particular commit having the highest priority ranking was successful (i.e., pass), yes output of step 824, then the computer identifies the particular commit as a good commit for a set of source files affected by that particular commit in the component of the software project (step 826). The computer also generates feedback information regarding the good commit for the set of source files affected by that particular commit in the component of the software project (step 828). Further, the computer updates the source code coverage information, the historical test case failure and fix record information, and the source code dependency graph information based on the feedback information regarding the good commit for the set of source files affected by that particular commit in the component of the software project (step 830).

Afterward, the computer makes a determination as to whether another commit exists in the priority queue (step 832). If the computer determines that another commit does exist in the priority queue, yes output of step 832, then the process returns to step 820 where the computer selects another commit having a next highest priority ranking in the priority queue. If the computer determines that another commit does not exist in the priority queue, no output of step 832, then the computer completes the build of the component of the software project to form a built component (step 834). The computer outputs the built component of the software project (step 836). Thereafter, the process terminates.

Returning again to step 824, if the computer determines that the test of the particular commit having the highest priority ranking was not successful (i.e., fail), no output of step 824, then the computer identifies the particular commit as a bad commit causing regression in the component of the software project (step 838). Furthermore, the computer estimates a time complexity corresponding to the priority queue to form an estimated time complexity (step 840). The computer makes a determination as to whether the estimated time complexity is greater than or equal to a defined maximum time complexity threshold (step 842). If the computer determines that the estimated time complexity is not greater than or equal to the defined maximum time complexity threshold, no output of step 842, then the process returns to step 832 where the computer determines whether another commit exists in the priority queue. If the computer determines that the estimated time complexity is greater than or equal to the defined maximum time complexity threshold, yes output of step 842, then the computer utilizes traditional bisection to identify bad commits (step 844). Thereafter, the process terminates.

Thus, illustrative embodiments of the present invention provide a computer-implemented method, computer system, and computer program product for managing an order of source code change set commits in a priority queue to be built and tested based on source code coverage information, historical test case failure and fix record information, and source code dependency graph information to decrease the time needed to identify software bugs in versions of the software project. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing source code change set commits to decrease time to identify software bugs in versions of a software project, the computer-implemented method comprising:

determining, by a computer, an initial order of relevant commits corresponding to the software project in a priority queue based on a weight of each respective commit of the relevant commits;

adjusting, by the computer, the initial order of the relevant commits in the priority queue based on a build distance between the relevant commits of affected source files;

selecting, by the computer, a particular commit having a highest priority ranking in the priority queue for build and test;

executing, by the computer, the build and the test of the particular commit having the highest priority ranking in the priority queue;

estimating, by the computer, a time complexity corresponding to the priority queue to form an estimated time complexity;

determining, by the computer, whether the estimated time complexity is greater than or equal to a defined maximum time complexity threshold; and responsive to the computer determining that the estimated time complexity is greater than or equal to the defined maximum time complexity threshold, utilizing, by the computer, bisection to identify bad commits.

2. The computer-implemented method of claim 1, further comprising:

determining, by the computer, whether the test of the particular commit having the highest priority ranking was successful; and responsive to the computer determining that the test of the particular commit having the highest priority ranking was successful, identifying, by the computer, the particular commit as a good commit for a set of source files affected by that particular commit of the software project.

3. The computer-implemented method of claim 2, further comprising:

generating, by the computer, feedback regarding the good commit for the set of source files affected by that particular commit of the software project;

updating, by the computer, source code coverage information, historical test case failure and fix record information, and source code dependency graph information based on the feedback regarding the good commit for the set of source files affected by that particular commit of the software project; and determining, by the computer, whether another commit exists in the priority queue.

4. The computer-implemented method of claim 3, further comprising:

responsive to the computer determining that another commit does not exist in the priority queue, completing, by the computer, the build of the software project to form a built software project; and outputting, by the computer, the built software project.

5. The computer-implemented method of claim 2, further comprising:

responsive to the computer determining that the test of the particular commit having the highest priority ranking was not successful, identifying, by the computer, the particular commit as a bad commit causing regression in the software project.

6. The computer-implemented method of claim 1, further comprising:

receiving, by the computer, an input to build and test the software project;

retrieving, by the computer, source code coverage information corresponding to the software project;

removing, by the computer, irrelevant commits that do not correspond to the software project based on the source code coverage information; and placing, by the computer, remaining relevant commits that correspond to the software project in the priority queue.

7. The computer-implemented method of claim 6, further comprising:

retrieving, by the computer, historical test case failure and fix record information corresponding to each particular source file affected by the remaining relevant commits in the priority queue; and assigning, by the computer, the weight to each respective commit of the remaining relevant commits based on the historical test case failure and fix record information corresponding to each particular source file affected by the remaining relevant commits.

8. The computer-implemented method of claim 1, further comprising:

retrieving, by the computer, source code dependency graph information corresponding to each particular source file affected by the relevant commits that indicates the build distance between the relevant commits of the affected source files of versions of the software project.

9. A computer system for managing source code change set commits to decrease time to identify software bugs in versions of a software project, the computer system comprising:

a bus system;

a storage device connected to the bus system, wherein the storage device stores program instructions; and a processor connected to the bus system, wherein the processor executes the program instructions to:

determine an initial order of relevant commits corresponding to the software project in a priority queue based on a weight of each respective commit of the relevant commits;

adjust the initial order of the relevant commits in the priority queue based on a build distance between the relevant commits of affected source files;

select a particular commit having a highest priority ranking in the priority queue for build and test;

execute the build and the test of the particular commit having the highest priority ranking in the priority queue;

estimate a time complexity corresponding to the priority queue to form an estimated time complexity;

determine whether the estimated time complexity is greater than or equal to a defined maximum time complexity threshold; and utilize bisection to identify bad commits in response to determining that the estimated time complexity is greater than or equal to the defined maximum time complexity threshold.

10. The computer system of claim 9, wherein the processor further executes the program instructions to:

determine whether the test of the particular commit having the highest priority ranking was successful; and identify the particular commit as a good commit for a set of source files affected by that particular commit of the software project in response to determining that the test of the particular commit having the highest priority ranking was successful.

11. The computer system of claim 10, wherein the processor further executes the program instructions to:

generate feedback regarding the good commit for the set of source files affected by that particular commit of the software project;

update source code coverage information, historical test case failure and fix record information, and source code dependency graph information based on the feedback regarding the good commit for the set of source files affected by that particular commit of the software project; and determine whether another commit exists in the priority queue.

12. The computer system of claim 11, wherein the processor further executes the program instructions to:
complete the build of the software project to form a built software project in response to determining that another commit does not exist in the priority queue; and
output the built software project.

13. The computer system of claim 10, wherein the processor further executes the program instructions to:
identify the particular commit as a bad commit causing regression in the software project in response to determining that the test of the particular commit having the highest priority ranking was not successful.

14. A computer program product for managing source code change set commits to decrease time to identify software bugs in versions of a software project, the computer program product comprising a computer-readable storage medium having program instructions embodied therewith, the program instructions executable by a computer to cause the computer to perform a method of:
determining, by the computer, an initial order of relevant commits corresponding to the software project in a priority queue based on a weight of each respective commit of the relevant commits;
adjusting, by the computer, the initial order of the relevant commits in the priority queue based on a build distance between the relevant commits of affected source files;
selecting, by the computer, a particular commit having a highest priority ranking in the priority queue for build and test;
executing, by the computer, the build and the test of the particular commit having the highest priority ranking in the priority queue;
estimating, by the computer, a time complexity corresponding to the priority queue to form an estimated time complexity;
determining, by the computer, whether the estimated time complexity is greater than or equal to a defined maximum time complexity threshold; and
responsive to the computer determining that the estimated time complexity is greater than or equal to the defined maximum time complexity threshold, utilizing, by the computer, bisection to identify bad commits.

15. The computer program product of claim 14, further comprising:
determining, by the computer, whether the test of the particular commit having the highest priority ranking was successful; and
responsive to the computer determining that the test of the particular commit having the highest priority ranking was successful, identifying, by the computer, the particular commit as a good commit for a set of source files affected by that particular commit of the software project.

16. The computer program product of claim 15, further comprising:
generating, by the computer, feedback regarding the good commit for the set of source files affected by that particular commit of the software project;
updating, by the computer, source code coverage information, historical test case failure and fix record information, and source code dependency graph information based on the feedback regarding the good commit for the set of source files affected by that particular commit of the software project; and
determining, by the computer, whether another commit exists in the priority queue.

17. The computer program product of claim 16, further comprising:
responsive to the computer determining that another commit does not exist in the priority queue, completing, by the computer, the build of the software project to form a built software project; and
outputting, by the computer, the built software project.

18. The computer program product of claim 15, further comprising:
responsive to the computer determining that the test of the particular commit having the highest priority ranking was not successful, identifying, by the computer, the particular commit as a bad commit causing regression in the software project.

* * * * *